United States Patent
Djukic et al.

(10) Patent No.: US 12,537,921 B2
(45) Date of Patent: Jan. 27, 2026

(54) SYSTEMS AND METHODS TO ACCOUNT FOR LATENCY ASSOCIATED WITH REMOTE DRIVING APPLICATIONS

(71) Applicant: Vay Technology GmbH, Berlin (DE)

(72) Inventors: Bogdan Djukic, Berlin (DE); Richard Schubert, Guadalupe (CR); Nicolai Wojke, Berlin (DE)

(73) Assignee: Vay Technology GmbH, Berlin (DE)

( * ) Notice: Subject to any disclaimer, the term of this patent is extended or adjusted under 35 U.S.C. 154(b) by 464 days.

(21) Appl. No.: 17/949,529

(22) Filed: Sep. 21, 2022

(65) Prior Publication Data

US 2024/0098226 A1    Mar. 21, 2024

(51) Int. Cl.
| | |
|---|---|
| H04N 7/18 | (2006.01) |
| G05D 1/00 | (2006.01) |
| G06T 11/00 | (2006.01) |
| H04N 5/265 | (2006.01) |
| H04N 17/00 | (2006.01) |

(52) U.S. Cl.
CPC ........... *H04N 7/185* (2013.01); *G05D 1/0016* (2013.01); *G05D 1/0038* (2013.01); *G06T 11/00* (2013.01); *H04N 5/265* (2013.01); *H04N 17/00* (2013.01)

(58) Field of Classification Search
CPC .... G05D 1/0246; G05D 1/0223; G05D 1/644; G05D 1/247; G05D 1/0016; G05D 1/65; G05D 1/0038; G05D 1/22; G05D 1/0022; G05D 1/0217; G05D 1/221; H04N 19/159; H04N 19/115; H04N 19/117; H04N 19/132; H04N 19/103; H04N 19/167; H04N 7/185; H04N 5/265; H04N 17/00; G06T 11/00
See application file for complete search history.

(56) References Cited

U.S. PATENT DOCUMENTS

| | | | | |
|---|---|---|---|---|
| 9,206,589 | B2* | 12/2015 | Price | G08C 17/02 |
| 9,317,035 | B2* | 4/2016 | Nakamura | G05D 1/0038 |
| 10,582,259 | B2* | 3/2020 | Enke | H04N 23/80 |
| 2008/0027591 | A1* | 1/2008 | Lenser | G05D 1/0038 |
| | | | | 701/28 |
| 2017/0192423 | A1 | 7/2017 | Rust et al. | |
| 2019/0179305 | A1 | 6/2019 | Magzimof et al. | |

(Continued)

FOREIGN PATENT DOCUMENTS

EP    3702864 B1    10/2021

OTHER PUBLICATIONS

International Search Report and Written Opinion mailed Nov. 8, 2023 in related International Application No. PCT/EP2023/076058.

*Primary Examiner* — Abderrahim Merouan
(74) *Attorney, Agent, or Firm* — Athorus, PLLC

(57) ABSTRACT

Systems and methods to account for latency associated with remote driving applications may include a vehicle having an imaging device and a teleoperator station in communication with each other via a network. Imaging data that is captured by the imaging device may be transmitted to the teleoperator station for presentation to a teleoperator. In order to account for latency in the transmission, receipt, processing, and presentation of the imaging data, one or more visualizations of the vehicle, with various visual characteristics, may be rendered within or overlaid onto the imaging data, in order to facilitate safe and reliable remote operation of the vehicle by the teleoperator at the teleoperator station.

20 Claims, 6 Drawing Sheets

(56) References Cited

U.S. PATENT DOCUMENTS

| | | | |
|---|---|---|---|
| 2019/0361436 A1* | 11/2019 | Ueda | G08G 1/09 |
| 2021/0078595 A1* | 3/2021 | Magzimof | G08G 1/20 |
| 2021/0191387 A1* | 6/2021 | Gunter | B60W 10/20 |
| 2021/0377707 A1 | 12/2021 | Pfadler et al. | |
| 2024/0098226 A1* | 3/2024 | Djukic | G05D 1/0016 |

* cited by examiner

SYSTEMS AND METHODS TO ACCOUNT FOR LATENCY ASSOCIATED WITH REMOTE DRIVING APPLICATIONS

BACKGROUND

Teleoperated remote driving of a vehicle may be considered a transient technology toward fully autonomous driving. In such remote driving applications, a teleoperator may use a teleoperator station to remotely drive the vehicle via a wireless communication network. To facilitate such remote driving applications, a live video stream representing a view of the vehicle's environment may be captured, transmitted, and presented to a teleoperator at the teleoperator station. However, the capture, transmission, receipt, and presentation of the live video stream may introduce a time delay or latency, such that the live video stream presented to the teleoperator may actually be at some time in the past. Accordingly, there is a need for systems and methods to account for latency to enable safe and reliable teleoperated remote driving of vehicles.

DETAILED DESCRIPTION

Figure 1:
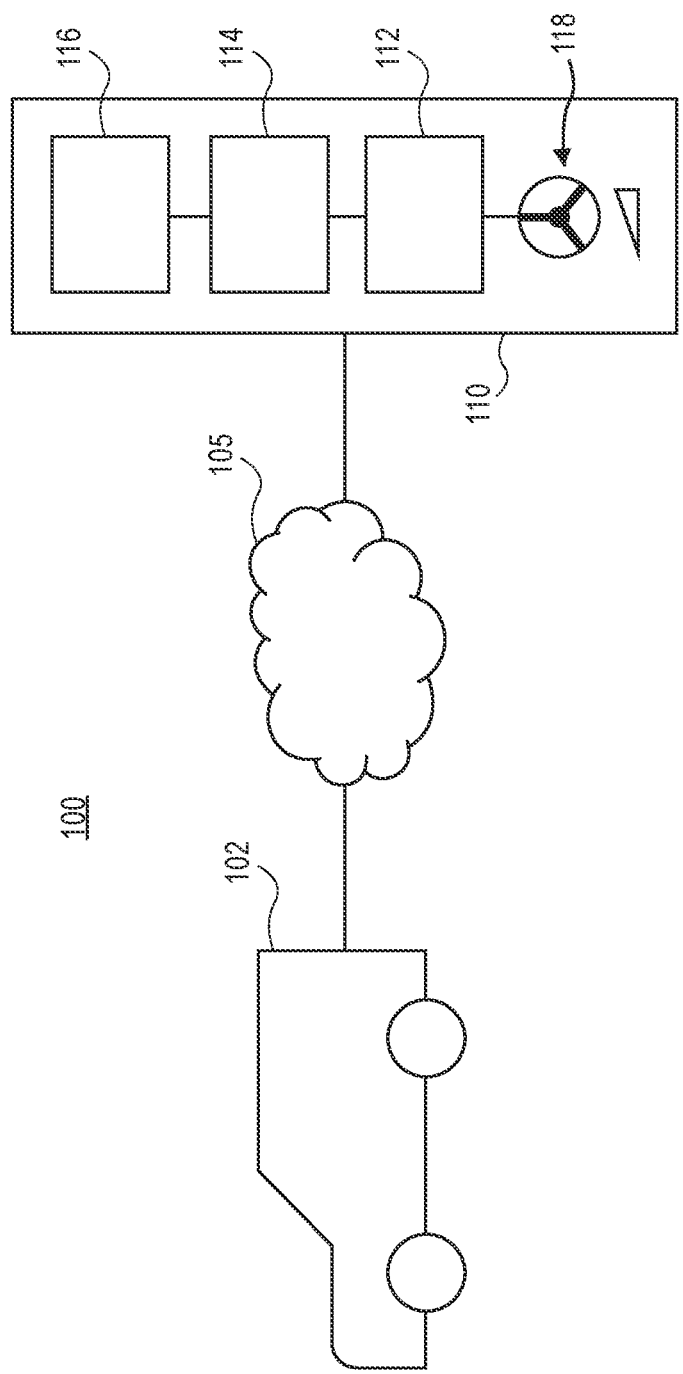
FIG. 1 is a schematic diagram of an example remote driving system, in accordance with implementations of the present disclosure.

As is set forth in greater detail below, implementations of the present disclosure are directed to systems and methods to account for latency to enable safe and reliable teleoperated remote driving of vehicles, which may be referred herein as remote driving systems, teledriving systems, and/or teleoperating systems.

In example embodiments of remote driving applications, a teleoperator may use a teleoperator station to remotely drive a vehicle within an environment via a wireless communication network. One or more imaging devices or sensors associated with the vehicle may capture a live video stream representing a view of the vehicle's environment. The live video stream may then be transmitted, processed, and presented to a teleoperator at the teleoperator station. At the teleoperator station, the teleoperator may view the live video stream and remotely drive the vehicle by using a control interface of the teleoperator station to generate drive control commands. Then, the drive control commands may be processed and transmitted from the teleoperator station to the vehicle, and the vehicle may receive, process, and execute the drive control commands.

Various aspects of the capture, transmission, receipt, processing, presentation, and/or execution of data, including live video streams and drive control commands, may introduce time delay or latency in remote driving applications. For example, the capture, transmission, receipt, processing, and/or presentation of live video streams from a vehicle to a teleoperator station may introduce time delay or latency, which may generally be referred to herein as video latency. Due to this video latency, the live video stream that is presented to a teleoperator at a teleoperator station may not actually be live or real-time, but may instead be associated with some time in the past based on a current value or amount of video latency. In example embodiments, average values of video latency may be approximately 100 ms, between approximately 50 ms and 150 ms, between approximately 20 ms and 180 ms, between approximately 0ms and 200 ms, or other values or ranges.

In addition, the receipt, transmission, processing, and/or execution of drive control commands from a teleoperator station to a vehicle may also introduce time delay or latency, which may generally be referred to herein as control latency. Due to this control latency, the drive control commands that are sent to the vehicle may actually be executed at some time in the future based on a current value or amount of control latency. In example embodiments, average values of control latency may be approximately 30 ms, approximately 40 ms, between approximately 20 ms and 50 ms, between approximately 0ms and 50 ms, between approximately 10 ms and 100 ms, or other values or ranges.

Further, the combination of video latency and control latency may generally be referred to herein as end-to-end latency. End-to-end latency may comprise or combine all sources of time delay or latency associated with the teleoperation control loop, including video latency associated with capturing, transmitting, and presenting a video stream from a vehicle to a teleoperator station, control latency associated with receiving, transmitting, and executing drive control commands from a teleoperator station to a vehicle, and/or other sources or types of latency associated with the teleoperation control loop. Due to the end-to-end latency, the teleoperator may be presented with a "past" rather than a live, real-time, or "current" view of the vehicle's environment, and the drive control commands may be executed by the vehicle at some time after such drive control commands are generated by a teleoperator at the teleoperator station.

In example embodiments described herein, a video stream received from one or more imaging devices or sensors associated with a vehicle may be processed and presented to account for video latency. For example, the video stream may be modified to include a visualization of the vehicle, e.g., a representation of at least a portion of the vehicle, based on the video latency. In this manner, an estimated position of the vehicle to account for video latency may be presented within the video stream to enable safe and reliable remote driving of the vehicle by a teleoperator. Further, various aspects of the visualization of the vehicle may be modified based on the video latency, such as by using various colors, highlighting, outlining, sharpness, focus, resolution, or other aspects.

In additional example embodiments, various values or amounts of uncertainty may be associated with the estimated position of the visualization of the vehicle to account for video latency. The values or amounts of uncertainty associated with the estimated position of the vehicle may be associated with a speed of the vehicle, an acceleration of the vehicle, a steering angle of the vehicle, and/or changes to speed, acceleration, or steering angle. For example, the visualization of the vehicle may be modified based on the values or amounts of uncertainty associated with the estimated position of the vehicle, such as by adjusting a size, sharpness, focus, resolution, or other aspects of the visualization. In addition, the video stream may also be modified to include a bounding box, maximum envelope, or other boundaries or borders around at least a portion of the visualization of the vehicle based on the values or amounts of uncertainty associated with the estimated position of the vehicle.

By modifying a video stream to include a visualization of a vehicle at an estimated position to account for video latency, a teleoperator may more intuitively and quickly perceive and understand the estimated actual position of the vehicle within an environment. For example, the visualization of a vehicle at an estimated position may be more intuitive and aid understanding by a teleoperator of the estimated actual position of the vehicle, as compared to other types of conventional notifications, alerts, or pathway indicators. Then, the teleoperator may generate drive control commands based on the estimated actual position of the vehicle to safely and reliably control the vehicle within the environment. Further, the generation and presentation of a visualization of a vehicle at an estimated position to account for video latency may be more efficient and less computationally intensive than alternative methods to account for video latency, such as by repositioning or regenerating the video stream from an estimated point of view that accounts for video latency.

FIG. 1 is a schematic diagram 100 of an example remote driving system, in accordance with implementations of the present disclosure.

As shown in FIG. 1, the example remote driving system may comprise a vehicle 102 that is adapted to be remotely driven, controlled, or instructed by a teleoperator via a wireless communication network 105. In addition, the example remote driving system may comprise a teleoperator station 110 for use by a teleoperator to remotely drive, control, or instruct the vehicle 102 via the wireless communication network 105.

In example embodiments, the vehicle 102 may comprise a car, such as a small car, a regular car, a Sports Utility Vehicle (SUV), a van, a truck, or any other type of vehicle that is adapted to be remotely driven, controlled, or instructed. In addition, the vehicle 102 may comprise a modified vehicle that includes or provides the required on-board infrastructure for teleoperation. For example, the vehicle 102 may include actuators for controlling the vehicle 102, one or more imaging devices, cameras, or sensors for capturing imaging data of the vehicle's environment, one or more sensors to detect or measure drive state information, and/or various interfaces for bi-directional communication with the teleoperator station 110 via the wireless communication network 105.

The actuators for controlling the vehicle 102 may include mechanical actuators that directly actuate the vehicle's steering wheel, acceleration pedal, brakes, and/or other systems or components of the vehicle 102. Alternatively, existing actuators of the vehicle 102 (e.g., for adjusting or controlling speed, acceleration, steering angle, and/or other operational characteristics) may be controlled via an electronic interface associated with the vehicle 102.

The imaging devices or cameras associated with the vehicle 102 may comprise various types of imaging sensors, analog cameras, digital cameras, video cameras, depth sensors, infrared sensors, time-of-flight sensors, or other types of imaging sensors. The imaging devices or cameras may be positioned and oriented at various positions on the vehicle 102 in order to capture imaging data of an environment at least partially around the vehicle 102, e.g., towards a forward movement direction, towards a rearward movement direction, and/or toward various other portions of a periphery of the vehicle 102. In addition, the imaging devices or cameras may capture imaging data, such as video data, live video streams, or other types of imaging data, which may be transmitted to the teleoperator station 110 and used to facilitate generation of a visualization of the vehicle within the imaging data, as further described herein.

The sensors to detect or measure drive state information of the vehicle 102 may comprise various types of sensors configured to detect speed, acceleration, steering angle, and/or other operational characteristics of the vehicle 102. For example, a first sensor such as a speedometer or encoder may measure a drive speed of the vehicle 102, a second sensor such as an accelerometer, pressure sensor, or encoder may measure pedal actuation, acceleration, deceleration, or braking of the vehicle 102, and/or a third sensor such as an encoder or position/orientation sensor may measure a steering state or angle of the steering wheel and/or measure an orientation of the vehicle wheels. The drive state information of the vehicle 102 may be transmitted to the teleoperator station 110, and may be used to facilitate generation of a visualization of the vehicle within the imaging data, as further described herein.

The interfaces for bi-directional communication with the teleoperator station 110 may enable transmission of imaging data, as well as transmission of drive state information associated with the vehicle 102, from the vehicle 102 to the teleoperator station 110 via the wireless communication network 105. In addition, the interfaces for bi-directional communication with the teleoperator station 110 may enable receipt of drive control commands and/or other data, information, commands, or instructions from the teleoperator station 110 via the wireless communication network 105.

In example embodiments, the wireless communication network 105 may comprise a network that allows for bi-directional transmission of data between the vehicle 102 and the teleoperator station 110. For example, the network 105 may be a fourth generation (4G) wireless communication network, a fifth generation (5G) wireless communication network, or other types of wireless communication networks.

Various data or information may be transmitted via the network 105, including imaging data and/or drive state information associated with the vehicle 102, e.g., from the vehicle 102 to the teleoperator station 110, as well as drive control commands and/or other data, information, commands, or instructions, e.g., from the teleoperator station 110 to the vehicle 102 via the wireless communication network 105. The drive state information may comprise data or information related to speed, acceleration, steering angle, and/or other operational data or characteristics associated with the vehicle 102. Further, additional data may be exchanged between the vehicle 102 and the teleoperator station 110, such as time synchronization information including data transmission timestamps.

In example embodiments, the teleoperator station 110 may comprise a communication unit 112 configured to send and receive data or information to and from the vehicle 102 via the network 105, a processor or processing unit 114 configured to process various data and generate a visualization of a vehicle to account for video latency as further described herein, a presentation or display device 116 configured to present the imaging data and the visualization of the vehicle to a teleoperator using the teleoperator station 110, and a control interface 118 configured to receive drive control commands from the teleoperator using the teleoperator station 110.

The communication unit 112 may comprise various types of communication systems, devices, antenna, interfaces, or other data transmit/receive units configured to enable wireless communication between the teleoperator station 110 and the vehicle 102 via the wireless communication network 105. As described herein, the communication unit 112 may receive imaging data, drive state information, and/or other data from the vehicle 102, and may transmit drive control commands and/or other data to the vehicle 102.

As further described herein, the capture, transmission, receipt, processing, and/or presentation of imaging data, e.g., video data or live video streams, from a vehicle 102 to a teleoperator station 110 via a network 105 may introduce time delay or latency, e.g., video latency. As a result, the imaging data that is presented to a teleoperator at a teleoperator station 110 may not actually be live or real-time, but instead may be associated with some time in the past based on a current value or amount of video latency. In addition, the receipt, transmission, processing, and/or execution of drive control commands from a teleoperator station 110 to a vehicle 102 via a network 105 may also introduce time delay or latency, e.g., control latency. As a result, the drive control commands that are sent to the vehicle 102 may actually be executed at some time in the future based on a current value or amount of control latency.

The processor 114 may comprise a processing unit, graphics processing unit, or other types of processors configured to process the various data that is received and/or sent between the vehicle 102 and teleoperator station 110 via the network 105. For example, the processor 114 may receive the imaging data, e.g., video data or live video streams, and determine a value or amount of video latency associated with the imaging data. In some examples, timestamps may be embedded within portions of the imaging data, e.g., as various embedded codes within one or more pixels, and the processor 114 may extract and decode the embedded timestamps to determine a current value or amount of video latency based on a comparison with a current time.

In other examples, timestamps may be sent together or along with imaging data, e.g., included in metadata or other portions of the imaging data, and the processor 114 may receive or detect the timestamps to determine a current value or amount of video latency based on a comparison with a current time. Various other methods may be used to provide timestamps associated with portions of imaging data, in order to determine a current value or amount of video latency. As further described herein, the processor 114 may generate a visualization of the vehicle within the imaging data based at least in part on the determined value or amount of video latency.

The processor 114 may also receive drive state information associated with the vehicle 102. For example, the drive state information may comprise data or information related to current speed, acceleration, steering angle, and/or other operational data or characteristics associated with the vehicle 102, and the processor 114 may generate a visualization of the vehicle within the imaging data based at least in part on the drive state information, as further described herein. In addition, the processor 114 may receive and process drive control commands received from a teleoperator associated with the teleoperator station 110, such that the drive control commands can be transmitted to the vehicle 102 via the network 105 in order to remotely drive, control, or instruct various systems or components of the vehicle 102.

In example embodiments, in order to generate a visualization of the vehicle within the imaging data, the processor 114 may determine a position of the vehicle, e.g., an estimated position, based on the video latency and/or the drive state information. For example, based on the amount of time that has elapsed since capture of the imaging data based on the video latency, and/or based on the drive state information, e.g., speed, acceleration, and/or steering angle, associated with the time of capture of the imaging data, an estimated position of the vehicle may be determined.

As an example, if the vehicle 102 is traveling along a straight path at a relatively slower speed and if the video latency is a relatively small value, a position of the visualization of the vehicle within the imaging data may be determined to be relatively closer to a viewpoint or perspective associated with the imaging data. In another example, if the vehicle 102 is traveling along a straight path at a relatively faster speed and if the video latency is a relatively large value, a position of the visualization of the vehicle within the imaging data may be determined to be relatively farther forward from a viewpoint or perspective associated with the imaging data.

In additional example embodiments, one or more characteristics of the visualization of the vehicle may be modified based on the video latency. As an example, if the video latency is a relatively large value, the visualization of the vehicle may change colors, e.g., from green to amber and/or red. In addition, highlighting, outlining, sharpness, focus, or resolution of the visualization of the vehicle may be reduced or made fuzzy to indicate a relatively large value of video latency. In another example, if the video latency is a relatively small value, the visualization of the vehicle may change colors, e.g., from red and/or amber to green. In addition, highlighting, outlining, sharpness, focus, or resolution of the visualization of the vehicle may be increased or made clear and distinctive to indicate a relatively small value of video latency.

In further example embodiments, the processor 114 may determine an uncertainty associated with the determined position, e.g., based on the video latency and/or the drive state information. For example, based on the determined uncertainty associated with the determined position, various characteristics of the visualization of the vehicle may be modified. In some examples, if the vehicle 102 is making a turn and if the video latency is a relatively large value such that the uncertainty associated with the position of the visualization of the vehicle is relatively high, a size, bounding box, or maximum envelope associated with the visualization of the vehicle may be increased or enlarged to indicate the level of uncertainty associated with the determined position. In addition or alternatively, a sharpness, focus, or resolution associated with the visualization of the vehicle may be reduced or made fuzzy to indicate the level of uncertainty associated with the determined position.

In other examples, if the vehicle 102 is moving along a relatively straight path and if the video latency is a relatively small value such that the uncertainty associated with the position of the visualization of the vehicle is relatively small, a size, bounding box, or maximum envelope associated with the visualization of the vehicle may be decreased or reduced to indicate the level of uncertainty associated with the determined position. In addition or alternatively, a sharpness, focus, or resolution associated with the visualization of the vehicle may be increased or made clear or distinctive to indicate the level of uncertainty associated with the determined position.

The presentation device 116 may comprise one or more monitors, screens, projectors, display devices, head-mounted displays, augmented reality displays, and/or other types of presentation devices. For example, the presentation device 116 may receive and present, render, or display the imaging data, e.g., video data or live video streams, received from the vehicle 102. In addition, the presentation device 116 may receive the visualization of the vehicle generated by the processor 114, and may present, render, or overlay the visualization of the vehicle within or onto the imaging data. The presentation device 116 may present the imaging data and the visualization of the vehicle, such that a teleoperator at the teleoperator station 110 may perceive and understand an environment around the vehicle 102 and safely and reliably drive, control, or instruct operations of the vehicle 102.

The control interface 118 may comprise a steering wheel, acceleration pedal, brake pedal, transmission selector, and/or various other interface components to generate drive control commands for the vehicle 102. In addition, the control interface 118 may include components, elements, or interfaces to control or instruct various other aspects of the vehicle 102, such as lights, turning indicators, windshield wipers, power windows, power doors, climate control systems, entertainment or infotainment systems, and/or various other systems, devices, or accessories associated with the vehicle 102. The control interface 118 may receive drive control commands provided or input by a teleoperator at the teleoperator station 110, which may then be processed and/or transmitted to the vehicle 102 via the network 105.

Although FIG. 1 illustrates an example remote driving system having a particular number, type, configuration, and arrangement of various components, other example embodiments may include various other numbers, types, configurations, and arrangements of the various components. For example, one or more vehicles may be in communication with one or more teleoperator stations, various types of wireless communication networks may be used to facilitate communication between vehicles and teleoperator stations, and/or various other modifications may be made in other example embodiments of the example remote driving system.

Figure 2:
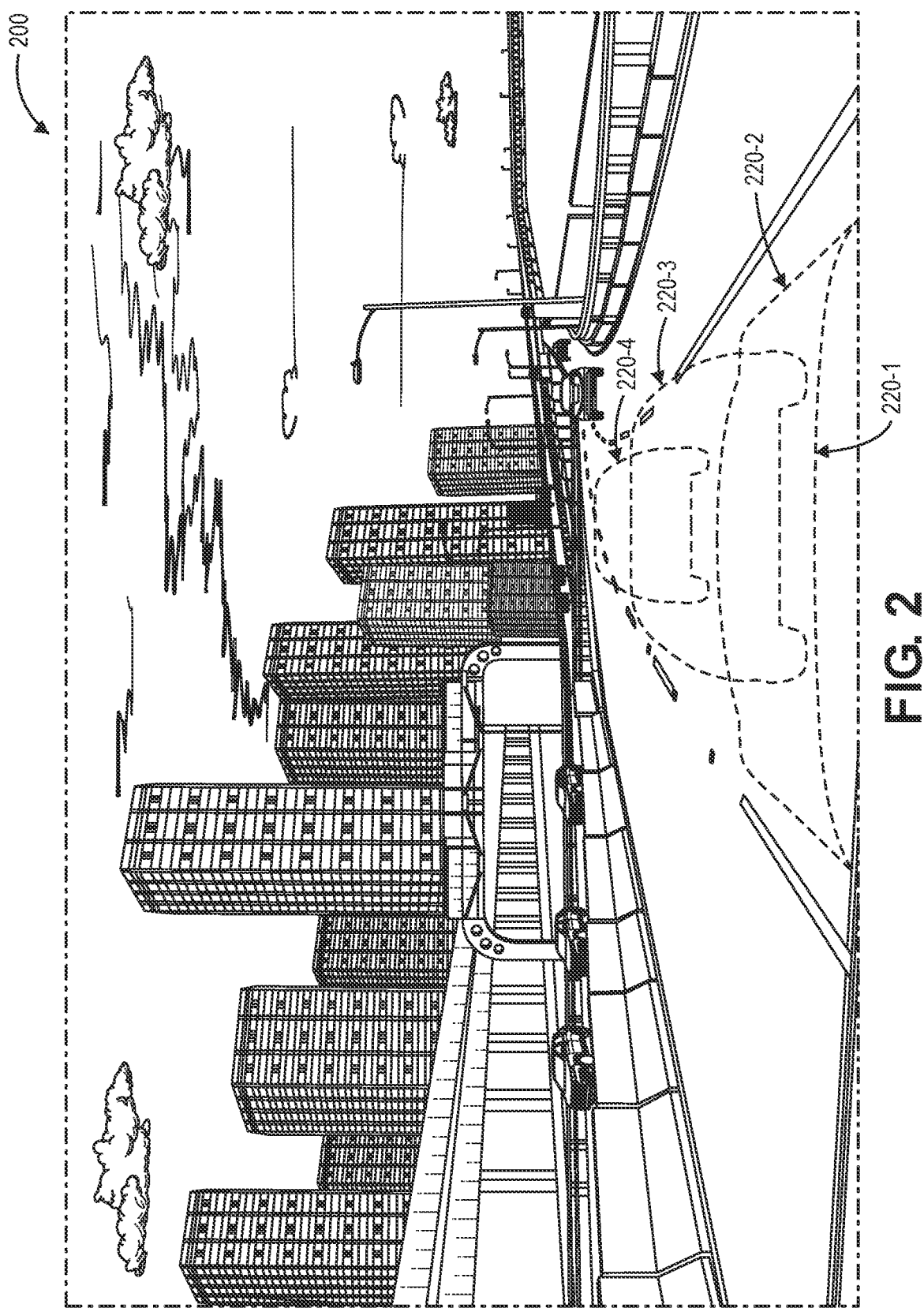
FIG. 2 is a schematic diagram of example visualizations to account for latency associated with a remote driving system, in accordance with implementations of the present disclosure.

FIG. 2 is a schematic diagram 200 of example visualizations to account for latency associated with a remote driving system, in accordance with implementations of the present disclosure.

As shown in FIG. 2, a vehicle may be traveling along a roadway or highway, and imaging data, e.g., video data or live video streams, of an environment of the vehicle may be captured and presented via a presentation device associated with a teleoperator station. The capture, transmission, receipt, processing, and/or presentation of the imaging data from the vehicle to the teleoperator station via a network may introduce time delay or latency, e.g., video latency. As a result, the imaging data that is presented via a presentation device at the teleoperator station may not actually be live or real-time, but may instead be associated with some time in the past based on a current value or amount of video latency.

In order to enable safe and reliable control of the vehicle by a teleoperator at the teleoperator station, a visualization 220 of the vehicle may be generated and presented within or overlaid onto the imaging data. FIG. 2 illustrates a plurality of different estimated positions of visualizations 220-1, 220-2, 220-3, 220-4 based on a value or amount of video latency and/or based on drive state information associated with the vehicle. In the examples of FIG. 2, no portion of the actual vehicle is represented within the imaging data, e.g., the imaging device or camera that captured the imaging data of the environment may have a field of view that does not include any portion of the actual vehicle.

In some example embodiments, based on a value or amount of video latency, a position of the visualization 220 of the vehicle may be estimated or determined. For example, for zero or relatively small values of video latency, the position of the visualization 220-1 of the vehicle may be relatively close to an actual position of the vehicle, as shown by the indication of only a far forward portion of the front of the vehicle. In addition, for still relatively smaller values of video latency but greater than the video latency associated with the visualization 220-1, the position of the visualization 220-2 of the vehicle may still remain relatively close to an actual position of the vehicle but be positioned somewhat farther forward than the visualization 220-1, as shown by the indication of a forward portion, e.g., hood, of the front of the vehicle.

Further, for relatively larger values of video latency that are greater than the video latency associated with the visualization 220-2, the position of the visualization 220-3 of the vehicle may be positioned forward of an actual position of the vehicle, as shown by the indication of a substantially complete vehicle within the imaging data. Moreover, for relatively larger values of video latency that are greater than the video latency associated with the visualization 220-3, the position of the visualization 220-4 of the vehicle may be positioned farther forward of an actual position of the vehicle, as shown by the indication of a most forward, substantially complete vehicle within the imaging data.

In addition to estimating or determining a position of the visualization 220 of the vehicle based on the video latency, one or more characteristics, e.g., visual characteristics, of the visualization 220 of the vehicle may be selected or determined based on the video latency. For example, one or more of a shape, size, color, highlighting, outlining, sharpness, focus, or resolution associated with the visualization 220 of the vehicle may be selected or modified based on a value of the video latency.

In some examples, the visualization 220 may have a first color, e.g., green, at smaller values of video latency, which may transition to a second color, e.g., amber or red, at larger values of video latency. For example, the visualizations 220-1, 220-2 may be presented in shades of a first color, e.g., green, the visualization 220-3 may be presented in a second color, e.g., amber, and the visualization 220-4 may be presented in a third color, e.g., red.

In other examples, the visualization 220 may have a first highlighting or outlining at smaller values of video latency, which may transition to a second highlighting or outlining at larger values of video latency. For example, the visualizations 220-1, 220-2 may be presented with dark, thick, and/or solid highlighting or outlining, the visualization 220-3 may be presented with medium, thinner, and/or solid highlighting or outlining, and the visualization 220-4 may be presented with light, broken, and/or dashed highlighting or outlining.

In further examples, the visualization 220 may have a first sharpness, focus, or resolution at smaller values of video latency, which may transition to a second sharpness, focus, or resolution at larger values of video latency. For example, the visualizations 220-1, 220-2 may be presented with sharp and focused lines or features, the visualization 220-3 may be presented with less sharp and focused lines or features, and the visualization 220-4 may be presented with fuzzy or blurred lines or features.

Furthermore, various combinations of one or more visual characteristics, including shape, size, color, highlighting, outlining, sharpness, focus, or resolution, may be incorporated into the visualizations 220 of the vehicle, in order to visually indicate to a teleoperator the current value or amount of video latency.

In additional example embodiments, in addition to the value or amount of video latency, a position of the visualization 220 of the vehicle may also be estimated or determined based on drive state information associated with the actual vehicle. For example, for a vehicle traveling at a relatively slow speed, the position of the visualization 220-1 of the vehicle may be relatively close to an actual position of the vehicle, as shown by the indication of only a far forward portion of the front of the vehicle. In addition, for a vehicle still traveling at a relatively slower speed but greater than the speed associated with the visualization 220-1, the position of the visualization 220-2 of the vehicle may still remain relatively close to an actual position of the vehicle but be positioned somewhat farther forward than the visualization 220-1, as shown by the indication of a forward portion, e.g., hood, of the front of the vehicle.

Further, for a vehicle traveling at a relatively faster speed than the speed associated with the visualization 220-2, the position of the visualization 220-3 of the vehicle may be positioned forward of an actual position of the vehicle, as shown by the indication of a substantially complete vehicle within the imaging data. Moreover, for a vehicle traveling at a faster speed than the speed associated with the visualization 220-3, the position of the visualization 220-4 of the vehicle may be positioned farther forward of an actual position of the vehicle, as shown by the indication of a most forward, substantially complete vehicle within the imaging data.

In addition, various other aspects of drive state information, including acceleration, deceleration, braking, steering angle, and/or other operational characteristics, may affect or modify the determination of a position of a visualization of the vehicle to be generated and presented within or overlaid onto imaging data. For example, for a vehicle that is braking or with a relatively higher rate of deceleration, the position of the visualization 220-1 of the vehicle may be relatively close to an actual position of the vehicle, as shown by the indication of only a far forward portion of the front of the vehicle. Further, for a vehicle with a relatively higher rate of acceleration, the position of the visualization 220-4 of the vehicle may be positioned farther forward of an actual position of the vehicle, as shown by the indication of a most forward, substantially complete vehicle within the imaging data. For vehicles with various values or amounts of steering angle, the positions of the visualizations 220 may be shifted left or right within the imaging data based on the values or amounts of steering angle.

Moreover, various combinations of values or amounts of video latency and drive state information may cause generation of various different visualizations of the vehicle. For example, for the combination of a vehicle traveling at a relatively faster speed and relatively small values of video latency, the position of the visualization 220 of the vehicle may be positioned at any of the various positions of the visualizations 220-1, 220-2, 220-3, 220-4, dependent upon the particular speed of the vehicle in combination with the particular values of video latency. Further, for the combination of a vehicle traveling at a relatively slower speed and relatively large values of video latency, the position of the visualization 220 of the vehicle may again be positioned at any of the various positions of the visualizations 220-1, 220-2, 220-3, 220-4, dependent upon the particular speed of the vehicle in combination with the particular values of video latency. In addition, other combinations of values or amounts of video latency and aspects of drive state information may cause generation of visualizations of the vehicle at various different positions within the imaging data.

Although FIG. 2 illustrates particular numbers, types, positions, configurations, or arrangements of visualizations of a vehicle based on video latency and/or drive state information, other example embodiments may include various other numbers, types, positions, configurations, or arrangements of visualizations of a vehicle. For example, the visualizations may have other sizes, shapes, or outlines, different colors, line types, line weights, highlighting, outlining, or other visual characteristics, and/or various other positions and/or orientations other than the examples illustrated in FIG. 2, which may depend on values of video latency, aspects of drive state information, and/or combinations thereof.

Figure 3:
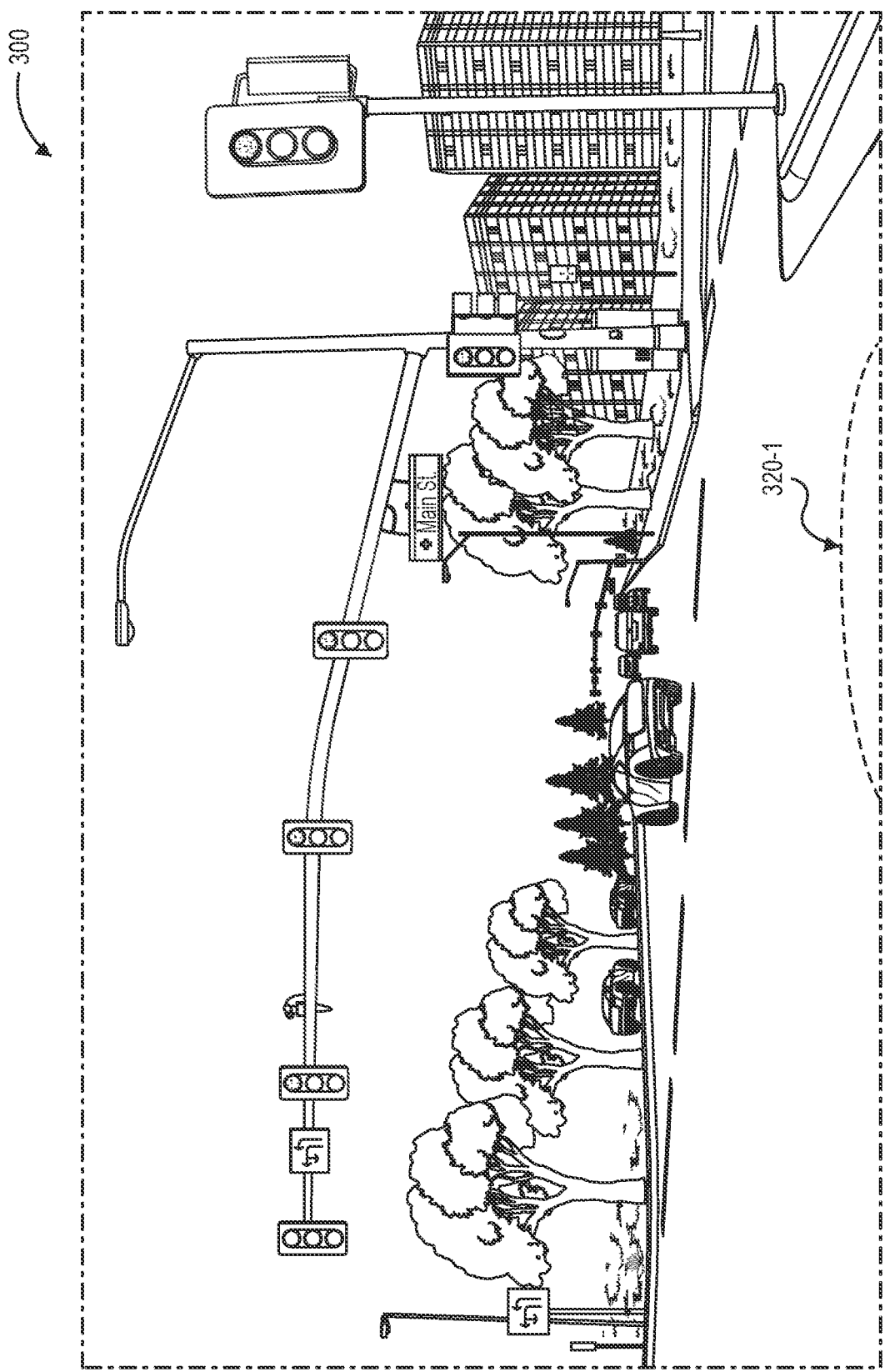
FIG. 3 is a schematic diagram of another example visualization to account for latency associated with a remote driving system, in accordance with implementations of the present disclosure.

FIG. 3 is a schematic diagram 300 of another example visualization to account for latency associated with a remote driving system, in accordance with implementations of the present disclosure.

As shown in FIG. 3, a vehicle may be stopped or traveling at a relatively slower speed near an intersection along a roadway, and imaging data, e.g., video data or live video streams, of an environment of the vehicle may be captured and presented via a presentation device associated with a teleoperator station. The capture, transmission, receipt, processing, and/or presentation of the imaging data from the vehicle to the teleoperator station via a network may introduce time delay or latency, e.g., video latency. As a result, the imaging data that is presented via a presentation device at the teleoperator station may not actually be live or real-time, but instead may be associated with some time in the past based on a current value or amount of video latency.

In order to enable safe and reliable control of the vehicle by a teleoperator at the teleoperator station, a visualization 320-1 of the vehicle may be generated and presented within or overlaid onto the imaging data. FIG. 3 illustrates an estimated position of a visualization 320-1 based on a value or amount of video latency and/or based on drive state information associated with the vehicle. In the example of FIG. 3, no portion of the actual vehicle is represented within the imaging data, e.g., the imaging device or camera that captured the imaging data of the environment may have a field of view that does not include any portion of the actual vehicle.

As described herein, based on a value or amount of video latency and/or based on drive state information associated with the vehicle, a position of the visualization 320-1 of the vehicle may be estimated or determined. In the example illustrated in FIG. 3, because the vehicle may be stopped or traveling at a relatively slower speed near an intersection along a roadway, the position of the visualization 320-1 may be relatively close to an actual position of the vehicle, as shown by the indication of only a far forward portion of the front of the vehicle. In some examples, e.g., when the vehicle has been stopped for some amount of time greater than a value or amount of video latency, no visualization of the vehicle may be presented within or overlaid onto the imaging data, because it may be estimated or determined that the current position of the vehicle is substantially aligned with the actual position of the vehicle.

As described at least with respect to FIG. 2, one or more characteristics, e.g., visual characteristics, of the visualization 320-1 of the vehicle may be selected or determined based on the video latency. For example, one or more of a shape, size, color, highlighting, outlining, sharpness, focus, or resolution associated with the visualization 320-1 of the vehicle may be selected or modified based on a value of the video latency. In the example illustrated in FIG. 3, although the position of the visualization 320-1 of the vehicle may be aligned with or relatively close to an actual position of the vehicle, the visualization 320-1 may still be presented with one or more characteristics that indicate a level or amount of video latency.

For example, even if the vehicle is stopped at an intersection for an amount of time close to or greater than a value or amount of video latency, the visualization 320-1 may still be presented with various characteristics based on the value or amount of video latency, e.g., high video latency or low video latency while stopped or moving slowly at the intersection. Furthermore, various combinations of one or more visual characteristics, including shape, size, color, highlighting, outlining, sharpness, focus, or resolution, may be incorporated into the visualization 320-1 of the vehicle, in order to visually indicate to a teleoperator the current value or amount of video latency.

Although FIG. 3 illustrates a particular number, type, position, configuration, or arrangement of a visualization of a vehicle based on video latency and/or drive state information, other example embodiments may include various other numbers, types, positions, configurations, or arrangements of visualizations of a vehicle. For example, the visualizations may have other sizes, shapes, or outlines, different colors, line types, line weights, highlighting, outlining, or other visual characteristics, and/or various other positions and/or orientations other than the example illustrated in FIG. 3, which may depend on values of video latency, aspects of drive state information, and/or combinations thereof.

Figure 4:
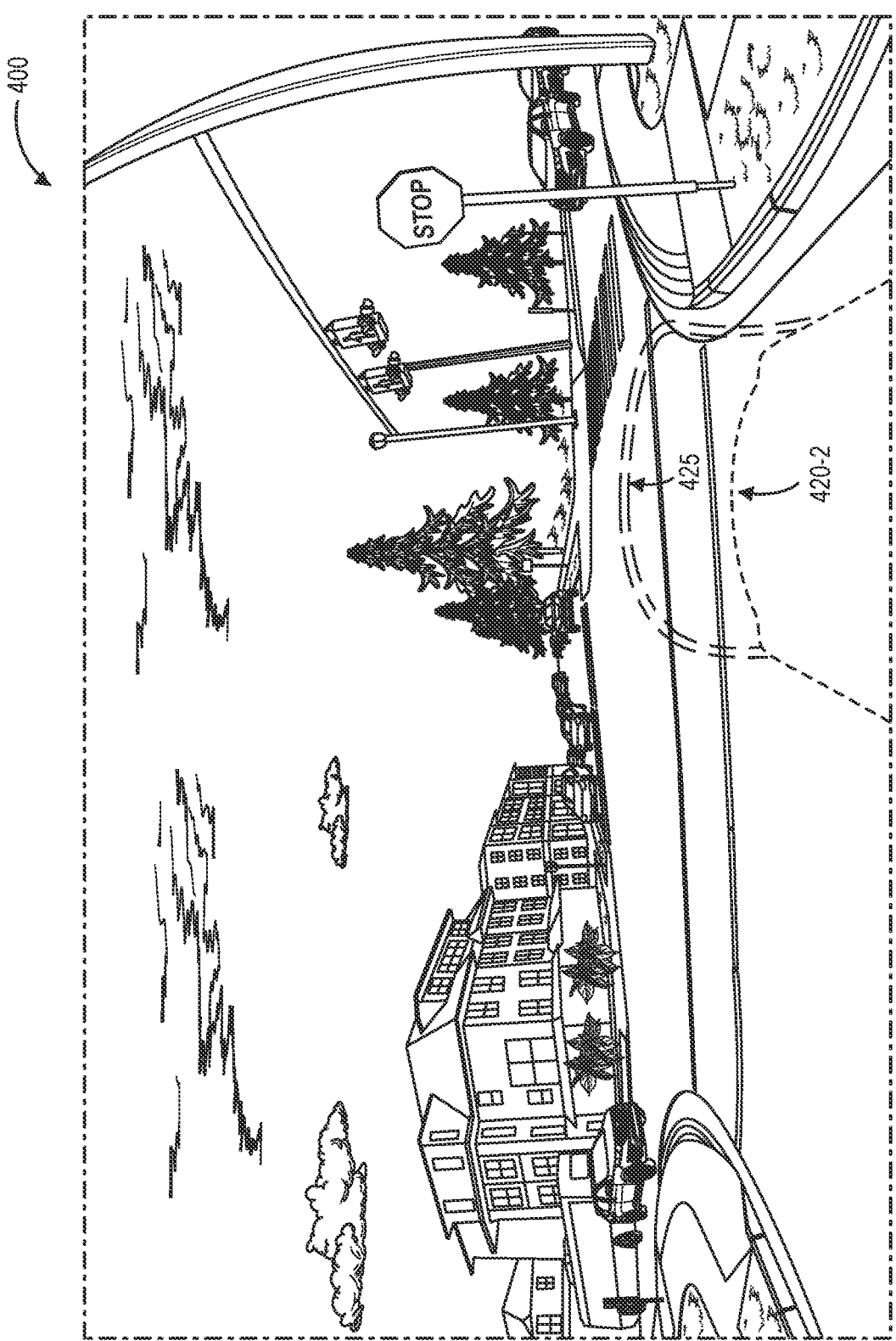
FIG. 4 is a schematic diagram of yet another example visualization to account for latency associated with a remote driving system, in accordance with implementations of the present disclosure.

FIG. 4 is a schematic diagram 400 of yet another example visualization to account for latency associated with a remote driving system, in accordance with implementations of the present disclosure.

As shown in FIG. 4, a vehicle may be traveling at a relatively slower speed and making a right hand turn near an intersection along a roadway, and imaging data, e.g., video data or live video streams, of an environment of the vehicle may be captured and presented via a presentation device associated with a teleoperator station. The capture, transmission, receipt, processing, and/or presentation of the imaging data from the vehicle to the teleoperator station via a network may introduce time delay or latency, e.g., video latency. As a result, the imaging data that is presented via a presentation device at the teleoperator station may not actually be live or real-time, but instead may be associated with some time in the past based on a current value or amount of video latency.

In order to enable safe and reliable control of the vehicle by a teleoperator at the teleoperator station, a visualization 420-2 of the vehicle may be generated and presented within or overlaid onto the imaging data. FIG. 4 illustrates an estimated position of a visualization 420-2 based on a value or amount of video latency and/or based on drive state information associated with the vehicle. In the example of FIG. 4, no portion of the actual vehicle is represented within the imaging data, e.g., the imaging device or camera that captured the imaging data of the environment may have a field of view that does not include any portion of the actual vehicle.

As described herein, based on a value or amount of video latency and/or based on drive state information associated with the vehicle, a position of the visualization 420-2 of the vehicle may be estimated or determined. In the example illustrated in FIG. 4, because the vehicle may be traveling at a relatively slower speed and making a right hand turn near an intersection along a roadway, the position of the visualization 420-2 may be a short distance forward along the roadway from an actual position of the vehicle, as shown by the indication of a forward portion, e.g., hood, of the front of the vehicle.

As described at least with respect to FIG. 2, one or more characteristics, e.g., visual characteristics, of the visualization 420-2 of the vehicle may be selected or determined based on the video latency. For example, one or more of a shape, size, color, highlighting, outlining, sharpness, focus, or resolution associated with the visualization 420-2 of the vehicle may be selected or modified based on a value of the video latency. In the example illustrated in FIG. 4, although the position of the visualization 420-2 of the vehicle may only be a short distance forward along the roadway from an actual position of the vehicle, the visualization 420-2 may still be presented with one or more characteristics that indicate a level or amount of video latency.

For example, even if the vehicle is moving very slowly at an intersection for an amount of time close to or greater than a value or amount of video latency, the visualization 420-2 may still be presented with various characteristics based on the value or amount of video latency, e.g., high video latency or low video latency while stopped or moving slowly at the intersection. Furthermore, various combinations of one or more visual characteristics, including shape, size, color, highlighting, outlining, sharpness, focus, or resolution, may be incorporated into the visualization 420-2 of the vehicle, in order to visually indicate to a teleoperator the current value or amount of video latency.

As further shown in the example of FIG. 4, an uncertainty associated with the estimated or determined position of the visualization 420-2 of the vehicle may be determined based on the video latency and/or drive state information. Then, one or more additional characteristics, e.g., visual characteristics, of the visualization of the vehicle 420-2 may be selected or determined based on the uncertainty associated with the determined position of the visualization 420-2 of the vehicle. For example, one or more of a size, bounding box, maximum envelope, sharpness, focus, or resolution associated with the visualization 420-2 of the vehicle may be modified based on the uncertainty.

The uncertainty associated with the estimated or determined position of the visualization of the vehicle may arise from various sources. For example, there may be various levels of uncertainty associated with determined values of latency, which may be associated with capture of imaging data, transmission of imaging data, processing of imaging data, and/or other aspects related to determining latency. In addition, there may be various levels of uncertainty associated with clock synchronization issues or errors between the vehicle and the teleoperator station. Further, there may be various levels of uncertainty associated with drive state information received from the vehicle, which may be associated with measured versus actual values of speed, acceleration, steering angle, and/or other aspects of drive state information. Various other sources of uncertainty may also be present within the systems and methods described herein, and may affect the visualizations that are to be generated and presented based on video latency.

For example, the uncertainty associated with the position of the visualization 420-2 may generally be higher with higher values of video latency, and may generally be lower with lower values of video latency. In addition, the uncertainty associated with the position of the visualization 420-2 may generally be higher at faster speeds, greater rates of acceleration or deceleration, and/or at larger steering angles, and may generally be lower at slower speeds, lower rates of acceleration or deceleration, and/or at smaller steering angles. Furthermore, various combinations of video latency and drive state information may result in various other levels of uncertainty associated with the position of the visualization 420-2.

In some examples, based on the determined uncertainty associated with the position of the visualization 420-2 of the vehicle, a size of the visualization 420-2 of the vehicle may be modified or adjusted. For example, the size of the visualization 420-2 may increase with greater uncertainty, and the size of the visualization 420-2 may decrease with lesser uncertainty.

In other examples, based on the determined uncertainty associated with the position of the visualization 420-2 of the vehicle, a bounding box or maximum envelope 425 associated with the visualization 420-2 of the vehicle may be further generated and rendered or presented to a teleoperator at the teleoperator station. For example, the size of the bounding box or maximum envelope 425 associated with the visualization 420-2 may increase with greater uncertainty, and the size of the bounding box or maximum envelope 425 associated with the visualization 420-2 may decrease with lesser uncertainty.

In further examples, based on the determined uncertainty associated with the position of the visualization 420-2 of the vehicle, a sharpness, focus, or resolution of the visualization 420-2 of the vehicle may be modified or adjusted. For example, the sharpness, focus, or resolution of the visualization 420-2 may decrease or become fuzzy and blurred with greater uncertainty, and the sharpness, focus, or resolution of the visualization 420-2 may increase or become sharp and focused with lesser uncertainty.

Furthermore, various combinations of one or more visual characteristics, including a size, bounding box, maximum envelope, sharpness, focus, or resolution, may be incorporated into the visualization 420-2 and/or associated bounding box or maximum envelope 425 of the vehicle, in order to visually indicate to a teleoperator a level of uncertainty associated with the estimated position of the visualization 420-2 of the vehicle that is presented within or overlaid onto the imaging data.

Although FIG. 4 illustrates a particular number, type, position, configuration, or arrangement of a visualization and bounding box of a vehicle based on video latency and/or drive state information, other example embodiments may include various other numbers, types, positions, configurations, or arrangements of visualizations and bounding boxes of a vehicle. For example, the visualizations and bounding boxes may have other sizes, shapes, or outlines, different colors, line types, line weights, highlighting, outlining, or other visual characteristics, and/or various other positions and/or orientations other than the example illustrated in FIG. 4, which may depend on values of video latency, aspects of drive state information, and/or combinations thereof.

Figure 5:
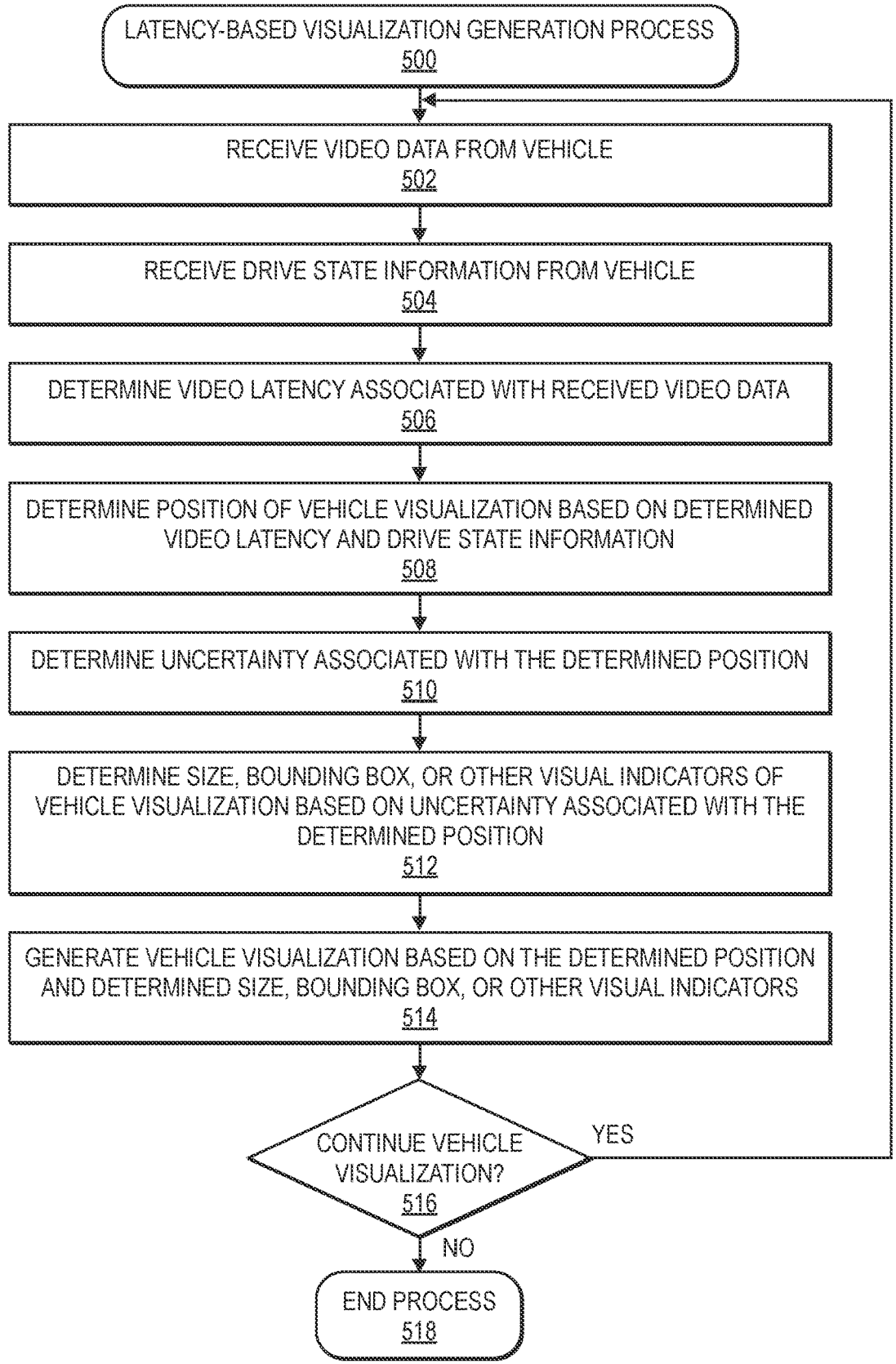
FIG. 5 is a flow diagram illustrating an example latency-based visualization generation process, in accordance with implementations of the present disclosure.

FIG. 5 is a flow diagram illustrating an example latency-based visualization generation process 500, in accordance with implementations of the present disclosure.

The process 500 may begin by receiving video data from a vehicle, as at 502. For example, one or more imaging sensors or devices associated with a vehicle may capture imaging data, e.g., video data, live video streams, or other types of imaging data, of an environment around the vehicle. The video data may comprise one or more frames of imaging data, and may also include timestamps, time synchronization data, metadata, and/or other related data. A communication unit associated with the vehicle may then transmit the video data to a teleoperator station via a communication network. Then, a communication unit and processor associated with the teleoperator station may receive the video data from the vehicle via the network.

The process 500 may continue by receiving drive state information from the vehicle, as at 504. For example, one or more sensors associated with the vehicle may detect or measure various operational characteristics of the vehicle, e.g., speed, acceleration, steering angle, and/or other aspects of drive state information. The communication unit associated with the vehicle may then transmit the drive state information to the teleoperator station via the communication network. Then, the communication unit and processor associated with the teleoperator station may receive the drive state information from the vehicle via the network.

The process 500 may proceed by determining video latency associated with the received video data, as at 506. For example, based on timestamps, time synchronization data, or other time-related data associated with the video data, a value or amount of video latency may be determined. In some examples, timestamps embedded or encoded within, or otherwise associated with, the video data may be compared with a current time to determine the value or amount of video latency. Further, the processor associated with the teleoperator station may determine the video latency.

The process 500 may then continue to determine a position of a vehicle visualization based on the determined video latency and drive state information, as at 508. For example, a position of a visualization of a vehicle may be estimated or determined, in order to render or present the visualization of the vehicle within or overlaid onto the video data for a teleoperator at the teleoperator station. The estimated position of the visualization of the vehicle may differ or vary based on the determined video latency as well as the drive state information. Generally, larger values of video latency may cause the position of the visualization of the vehicle to be farther along a movement path or direction of the vehicle within the video data, whereas smaller values of video latency may cause the position of the visualization of the vehicle to be closer to an actual position of the vehicle within the video data. Likewise, greater speed, acceleration, or steering angles of the drive state information may cause the position of the visualization of the vehicle to be farther along a movement path or direction of the vehicle within the video data, whereas lesser speed, acceleration, or steering angles of the drive state information may cause the position of the visualization of the vehicle to be closer to an actual position of the vehicle within the video data. Various combinations of video latency and drive state information may cause further changes or modifications to the estimated position of the visualization of the vehicle. Moreover, the visualization of the vehicle may be presented with various visual characteristics, e.g., shape, size, color, highlighting, outlining, sharpness, focus, or resolution, that may vary based on the determined video latency. Further, the processor associated with the teleoperator station may determine the position of the visualization of the vehicle.

The process 500 may proceed to determine an uncertainty associated with the determined position, as at 510. For example, an uncertainty associated with the estimated position of the visualization of the vehicle may be determined based on the video latency and/or drive state information. Generally, larger values of video latency may result in higher levels of uncertainty with respect to the estimated position of the visualization of the vehicle within the video data, whereas smaller values of video latency may result in lower levels of uncertainty with respect to the estimated position of the visualization of the vehicle within the video data. Likewise, greater speed, acceleration, or steering angles of the drive state information may result in higher levels of uncertainty with respect to the estimated position of the visualization of the vehicle within the video data, whereas lesser speed, acceleration, or steering angles of the drive state information may result in lower levels of uncertainty with respect to the estimated position of the visualization of the vehicle within the video data. Various combinations of video latency and drive state information may cause further changes or modifications to the level of uncertainty associated with the estimated position of the visualization of the vehicle. Further, the processor associated with the teleoperator station may determine the uncertainty associated with the estimated position of the visualization of the vehicle.

The process 500 may continue with determining a size, bounding box, or other visual indicators of the vehicle visualization based on the uncertainty associated with the determined position, as at 512. For example, the visualization of the vehicle may be presented with various visual characteristics, e.g., size, sharpness, focus, or resolution, that may vary based on the determined uncertainty of the estimated position. In some examples, the visualization may be enlarged or increased in size with higher levels of uncertainty and shrunken or reduced in size with lower levels of uncertainty. In other examples, the visualization may be presented with lower sharpness, focus, or resolution for higher levels of uncertainty and with greater sharpness, focus, or resolution for lower levels of uncertainty. Furthermore, a bounding box or maximum envelope may be further generated for presentation to the teleoperator with the visualization of the vehicle, as a further indicator of the uncertainty associated with the estimated position of the visualization, and the size or visual characteristics of the bounding box or maximum envelope may also vary based on the determined levels of uncertainty. Further, the processor associated with the teleoperator station may determine the visual characteristics of the visualization of the vehicle based on the uncertainty associated with the estimated position.

The process 500 may then proceed with generating the vehicle visualization based on the determined position and determined size, bounding box, or other visual indicators, as at 514. For example, based on the estimated position and visual characteristics of the visualization, and also potentially based on visual characteristics of a bounding box or maximum envelope associated with the visualization, the visualization may be generated and presented via a presentation device associated with the teleoperator station. As described herein, the visualization of the vehicle that accounts for video latency may be presented within or overlaid onto the video data for presentation to a teleoperator at the teleoperator station. As a result, the teleoperator may more easily perceive and understand a current position of the vehicle in the environment that accounts for video latency, so that the teleoperator may then safely and reliably drive, control, or instruct the vehicle using a control interface at the teleoperator station. Further, the processor associated with the teleoperator station may generate the visualization of the vehicle, as well as cause presentation of the visualization to a teleoperator via the presentation device of the teleoperator station.

The process 500 may then determine whether to continue the vehicle visualization, as at 516. For example, if remote driving, or teleoperation, of the vehicle is to continue, then generation and presentation of the visualization of the vehicle to a teleoperator may continue, and the process 500 may return to step 502 to receive updated data and generate or update the visualization of the vehicle. Further, the processor associated with the teleoperator station may determine whether to continue generation and presentation of the visualization of the vehicle.

If, however, remote driving of the vehicle is to stop or is completed, then generation and presentation of the visualization of the vehicle may be stopped, and the process may end, as at 518. For example, remote driving of the vehicle may stop as a result of various factors, including parking the vehicle in the environment, shutting off the vehicle in the environment, handover of control of the vehicle to a driver physically present within the vehicle, and/or various other factors.

Figure 6:
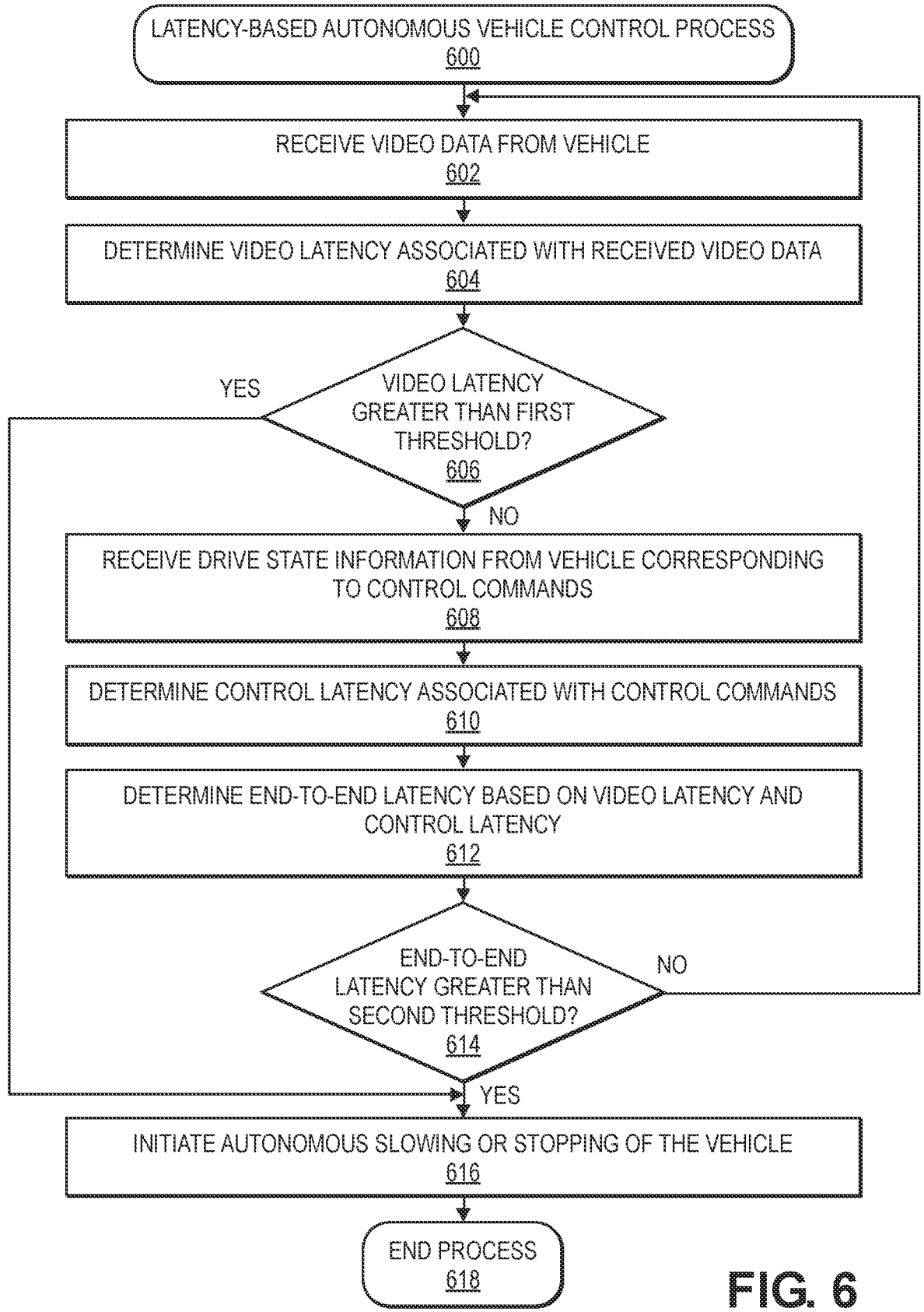
FIG. 6 is a flow diagram illustrating an example latency-based autonomous vehicle control process, in accordance with implementations of the present disclosure.

FIG. 6 is a flow diagram illustrating an example latency-based autonomous vehicle control process 600, in accordance with implementations of the present disclosure.

The process 600 may begin by receiving video data from a vehicle, as at 602. For example, one or more imaging sensors or devices associated with a vehicle may capture imaging data, e.g., video data, live video streams, or other types of imaging data, of an environment around the vehicle. The video data may comprise one or more frames of imaging data, and may also include timestamps, time synchronization data, metadata, and/or other related data. A communication unit associated with the vehicle may then transmit the video data to a teleoperator station via a communication network. Then, a communication unit and processor associated with the teleoperator station may receive the video data from the vehicle via the network.

The process 600 may continue by determining video latency associated with the received video data, as at 604. For example, based on timestamps, time synchronization data, or other time-related data associated with the video data, a value or amount of video latency may be determined. In some examples, timestamps embedded or encoded within, or otherwise associated with, the video data may be compared with a current time to determine the value or amount of video latency. Further, the processor associated with the teleoperator station may determine the video latency.

The process 600 may proceed by determining whether the video latency is greater than a first threshold, as at 606. For example, the value or amount of video latency may be compared with a first threshold value related to video latency. In example embodiments, the first threshold value may be approximately 190 ms, approximately 200 ms, approximately 220 ms, approximately 250 ms, between approximately 0ms and 200 ms, between approximately 0ms and 300 ms, or other values or ranges. The first threshold value may be associated with a maximum permissible or allowable amount of video latency to ensure safe and reliable teleoperation of the vehicle. Further, the processor associated with the teleoperator station may determine whether the video latency is greater than the first threshold.

If it is determined that the video latency is not greater than the first threshold, the process 600 may continue to receive drive state information from the vehicle corresponding to control commands, as at 608. For example, one or more sensors associated with the vehicle may detect or measure various operational characteristics of the vehicle, e.g., speed, acceleration, steering angle, and/or other aspects of drive state information, that correspond to drive control commands that were transmitted from the teleoperator station to the vehicle via the network. The communication unit associated with the vehicle may then transmit the drive state information corresponding to the drive control commands to the teleoperator station via the communication network. Then, the communication unit and processor associated with the teleoperator station may receive the drive state information corresponding to the drive control commands from the vehicle via the network.

The process 600 may then proceed to determine control latency associated with the control commands, as at 610. For example, timestamps or other time synchronization information may be associated with the drive state information to facilitate determination of the control latency associated with the control commands. In some examples, times associated with portions of the drive state information that correspond to drive control commands that were transmitted from the teleoperator station to the vehicle via the network may be compared with times of transmission of the drive control commands via the network to the vehicle, and/or times of receipt of the drive control commands from the teleoperator at the teleoperator station. In other examples, the video data may be processed, e.g., using various image processing techniques or algorithms, to determine times of execution of drive control commands transmitted from the teleoperator station to the vehicle via the network, and such times of execution may be compared with times of transmission of the drive control commands via the network to the vehicle, and/or times of receipt of the drive control commands from the teleoperator at the teleoperator station. Generally, the control latency may comprise a difference between a time of execution of a drive control command by the vehicle and a time of transmission and/or receipt of the drive control command from a teleoperator at the teleoperator station. Further, the processor associated with the teleoperator station may determine the control latency.

The process 600 may then continue with determining end-to-end latency based on video latency and control latency, as at 612. For example, the end-to-end latency may be a sum of the values of video latency and control latency. In addition, the end-to-end latency may also comprise various other values or amounts of latency associated with the teleoperation control loop. Further, the processor associated with the teleoperator station may determine the end-to-end latency.

The process 600 may proceed with determining whether the end-to-end latency is greater than a second threshold, as at 614. For example, the value or amount of end-to-end latency may be compared with a second threshold value related to end-to-end, or total, latency. In example embodiments, the second threshold value may be approximately 240 ms, approximately 250 ms, approximately 270 ms, approximately 300 ms, approximately 350 ms, between approximately 300 ms and 400 ms, between approximately 200 ms and 400 ms, or other values or ranges. The second threshold value may be associated with a maximum permissible or allowable amount of end-to-end latency to ensure safe and reliable teleoperation of the vehicle. Further, the processor associated with the teleoperator station may determine whether the end-to-end latency is greater than the second threshold.

If it is determined that the end-to-end latency is not greater than the second threshold, the process 600 may return to step 602 to continue to allow teleoperation of the vehicle, and continue to monitor levels, values, or amounts of video, control, and/or end-to-end latency.

If, however, it is determined that the video latency is greater than the first threshold, as at 606, and/or if it is determined that the end-to-end latency is greater than the second threshold, as at 614, the process 600 may initiate autonomous slowing or stopping of the vehicle, as at 616. For example, the vehicle may be instructed to initiate one or more autonomous driving or control routines or programs to ensure safety of the vehicle and its surroundings. Such safe autonomous driving or control routines or programs may comprise minimum risk maneuvers and/or minimum risk conditions. In some examples, the vehicle may autonomously slow down and/or stop in response to one or more values of latency exceeding respective thresholds. In other examples, the vehicle may autonomously continue operation and/or identify a safe stopping location, e.g., may continue through an intersection and then pull over on a shoulder or side of the roadway. Various other autonomous driving or control routines or programs may be implemented or executed to ensure safety of the vehicle and its surroundings. Alternatively or in addition, if the vehicle does not receive driving control commands and/or does not have a communication connection with the teleoperator station via the network for a determined period of time, one or more autonomous driving or control routines or programs may also be implemented or executed to ensure safety of the vehicle and its surroundings. Further, the processor associated with the teleoperator station may initiate or instruct autonomous control of the vehicle.

The process 600 may then end, as at 618.

As described herein, by modifying or overlaying a video stream to include a visualization of a vehicle at an estimated position to account for video latency, a teleoperator may more intuitively and quickly perceive and understand the estimated actual position of the vehicle within an environment. For example, the visualization of a vehicle at an estimated position may be more intuitive and aid understanding by a teleoperator of the estimated actual position of the vehicle, as compared to other types of conventional notifications, alerts, or pathway indicators. Then, the teleoperator may generate drive control commands based on the estimated actual position of the vehicle to safely and reliably control the vehicle within the environment.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5 and 6, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method to account for video latency in a remote driving system, comprising:
   receiving, by a processor at a teleoperator station via a communication network, video data from an imaging device associated with a vehicle, the vehicle being positioned within an environment remote from the teleoperator station;
   receiving, by the processor via the communication network, drive state information associated with the vehicle;
   determining, by the processor, a video latency associated with the video data;
   determining, by the processor, a position of a visualization of the vehicle within the video data based on the video latency and the drive state information;
   determining, by the processor, a first characteristic associated with the visualization based on the video latency, wherein the first characteristic comprises at least one of a shape, size, color, highlighting, outlining, sharpness, focus, or resolution associated with the visualization of the vehicle;
   determining, by the processor, an uncertainty associated with the position of the visualization based on the drive state information;
   determining, by the processor, a second characteristic associated with the visualization based on the uncertainty;
   generating, by the processor, the visualization of the vehicle within the video data based on the position, the first characteristic, and the second characteristic associated with the visualization; and
   presenting, by the processor via a presentation device of the teleoperator station, the visualization of the vehicle within the video data.

2. The method of claim 1, wherein the drive state information comprises at least one of a speed, an acceleration, or a steering angle associated with the vehicle.

3. The method of claim 1, wherein the video latency is between approximately 0 ms and approximately 200 ms.

4. The method of claim 1, wherein the second characteristic associated with the visualization comprises at least one of a size, sharpness, focus, resolution, a bounding box, or a maximum envelope associated with the visualization of the vehicle.

5. A method, comprising:
   receiving, by a processor associated with a teleoperator station via a communication network, imaging data from an imaging device associated with a vehicle, the vehicle being positioned within an environment remote from the teleoperator station;
   receiving, by the processor via the communication network, drive state information associated with the vehicle;
   determining, by the processor, a latency associated with the imaging data, the latency comprising video latency and control latency, and the control latency based at least in part on a time of execution of a drive control command by the vehicle;
   determining, by the processor, a position of a visualization of the vehicle within the imaging data based on the latency and the drive state information;
   determining, by the processor, a first characteristic associated with the visualization based on the latency, wherein the first characteristic comprises at least one of a shape, size, color, highlighting, outlining, sharpness, focus, or resolution associated with the visualization of the vehicle; and generating, by the processor, the visualization of the vehicle for presentation within the imaging data based on the position of the visualization and the first characteristic associated with the visualization.

6. The method of claim 5, wherein the imaging data comprises video data associated with the environment around the vehicle.

7. The method of claim 5, wherein the drive state information comprises at least one of a speed, an acceleration, or a steering angle associated with the vehicle.

8. The method of claim 5, wherein determining the latency associated with the imaging data comprises:
    decoding, by the processor, a timestamp embedded within the imaging data;
    comparing, by the processor, the timestamp with a current time; and
    determining the latency based on a difference between the timestamp and the current time.

9. The method of claim 5, wherein the visualization of the vehicle comprises a representation of at least a portion of the vehicle within the imaging data.

10. The method of claim 5, further comprising:
    determining, by the processor, an uncertainty associated with the position of the visualization based on the drive state information; and
    determining, by the processor, a second characteristic associated with the visualization based on the uncertainty;
    wherein the second characteristic comprises at least one of a size, sharpness, focus, resolution, a bounding box, or a maximum envelope associated with the visualization of the vehicle.

11. The method of claim 5, further comprising:
    presenting, by the processor via a presentation device of the teleoperator station, the visualization of the vehicle within the imaging data.

12. The method of claim 5, further comprising:
    comparing, by the processor, the video latency with a threshold value for video latency;
    determining, by the processor, that the video latency is greater than the threshold value for video latency; and
    causing, by the processor, the vehicle to slow or stop based on the video latency;
    wherein the threshold value for video latency is between approximately 0 ms and 300 ms.

13. The method of claim 5, further comprising:
    comparing, by the processor, an end-to-end latency with a threshold value for end-to-end latency, the end-to-end latency including the video latency and the control latency;
    determining, by the processor, that the end-to-end latency is greater than the threshold value for end-to-end latency; and
    causing, by the processor, the vehicle to slow or stop based on the end-to-end latency;
    wherein the threshold value for end-to-end latency is between approximately 300 ms and 400 ms.

14. The method of claim 5, wherein the time of execution of the drive control command is determined based on a timestamp associated with a portion of the drive state information that corresponds to the drive control command.

15. The method of claim 5, wherein the time of execution of the drive control command is determined based on processing of video data that includes a representation of execution of the drive control command by the vehicle.

16. The method of claim 5, wherein the control latency is determined based on a comparison between the time of execution of the drive control command and at least one of a transmission time or a reception time of the drive control command from the teleoperator station.

17. A remote driving system, comprising:
    a vehicle within an environment, the vehicle comprising an imaging device; and
    a teleoperator station that is remote from the vehicle, the teleoperator station in communication with the vehicle via a communication network, the teleoperator station comprising a control interface, a presentation device, and a processor;
    wherein the processor is configured to at least:
        receive imaging data from the imaging device associated with the vehicle;
        receive drive state information associated with the vehicle;
        determine a latency associated with the imaging data, the latency comprising video latency and control latency, and the control latency based at least in part on a time of execution of a drive control command by the vehicle;
        determine a position of a visualization of the vehicle within the imaging data based on the latency and the drive state information;
        determine a first visual characteristic associated with the visualization based on the latency, the first visual characteristic comprising at least one of a shape, size, color, highlighting, outlining, sharpness, focus, or resolution; and
        generate the visualization of the vehicle for presentation within the imaging data based on the position of the visualization and the first visual characteristic associated with the visualization.

18. The remote driving system of claim 17, wherein the processor is further configured to at least:
    present, via the presentation device, the visualization of the vehicle within the imaging data.

19. The remote driving system of claim 17, wherein the visualization of the vehicle comprises a representation of at least a portion of the vehicle that is presented via the presentation device within the imaging data.

20. The remote driving system of claim 17, wherein the processor is further configured to at least:
    determine a second visual characteristic associated with the visualization based on the drive state information, the second visual characteristic comprising at least one of a size, sharpness, focus, resolution, a bounding box, or a maximum envelope; and
    wherein the visualization of the vehicle comprises the second visual characteristic that is presented via the presentation device within the imaging data.

* * * * *